United States Patent

[11] 3,593,108

| [72] | Inventor | Michael E. Halleck<br>Boulder, Colo. |
|---|---|---|
| [21] | Appl. No. | 812,188 |
| [22] | Filed | Apr. 1, 1969 |
| [45] | Patented | July 13, 1971 |
| [73] | Assignee | Ball Brothers Research Corporation<br>Boulder, Colo. |

[54] AUTOMATICALLY REGULATED DIRECT CURRENT GENERATING SYSTEM
8 Claims, 2 Drawing Figs.

| [52] | U.S. Cl. | 321/18, 321/47 |
|---|---|---|
| [51] | Int. Cl. | H02m 7/00 |
| [50] | Field of Search | 321/2, 18 |

[56] References Cited
UNITED STATES PATENTS

| 3,304,487 | 2/1967 | McCaskey, Jr. | 321/18 X |
|---|---|---|---|
| 3,310,728 | 3/1967 | Jackson | 321/18 |
| 3,356,927 | 12/1967 | Barron | 321/18 |
| 3,375,428 | 3/1968 | Mitchell | 321/18 |
| 3,414,798 | 12/1968 | Nielsen | 321/18 X |
| 3,418,557 | 12/1968 | Schaefer | 321/18 |
| 3,452,268 | 6/1969 | Grossoehme | 321/18 |
| 3,466,527 | 9/1969 | Ping Sun Chun | 321/18 X |
| 3,470,444 | 9/1969 | Bixby | 321/18 X |
| 3,486,105 | 12/1969 | Breniere | 321/18 |

Primary Examiner—William M. Shoop, Jr.
Attorney—Campbell, Harris & O'Rourke

ABSTRACT: An automatically regulated direct current generating system wherein the amplitude of a square wave signal is controlled by an error voltage derived from a direct current output signal produced by coupling the amplitude controlled square wave signal through an isolation stage and drivers to a transformer where a sine wave is produced and the output rectified. The direct current signal is a high voltage, high current signal suitable for use in providing DC voltages to a cathode-ray tube in a TV system.

INVENTOR.
MICHAEL E. HALLECK 3,593,108

AUTOMATICALLY REGULATED DIRECT CURRENT GENERATING SYSTEM

BACKGROUND OF THE INVENTION

1. Field of the Invention

This invention relates to a direct current generating system and, more particularly, relates to an automatically regulated DC generating system.

2. Description of the Prior Art

It is oftentimes desirable to generate a high voltage direct current signal and to automatically regulate the signal thus produced. Often such a signal must, in addition, be synchronized with other system signals, such as would be the case, for example, where the direct current signal is to be applied to a cathode-ray tube synchronization with the horizontal sweep of the system.

While generation of direct current signals for TV systems have been heretofore commonly utilized, improvement of equipment for generation of such signals to achieve equipment having enhanced dependability, economy, and/or performance is a desired end.

In addition, while voltage regulators which act on a rectified output from a transformer are known in the art, these regulators commonly provide a DC signal that is of relatively low current, the impedance of the transformer primary circuit is necessarily varied to achieve regulation and/or the regulator is incapable of providing a regulated and synchronized direct current output signal utilizing a pulse input signal.

SUMMARY OF THE INVENTION

This invention provides an automatically regulated direct current generating system that is dependable yet economical and provides high quality performance in generating a high voltage, high direct current regulated signal that can be derived from a pulse input signal. When utilizing a horizontal sync pulse input signal, this invention provides a high voltage, high direct current regulated signal suitable for use with a cathode-ray tube with the DC signal supplied to the cathode-ray tube being synchronized with the horizontal sweep of the system.

It is therefore an object of this invention to provide an automatically regulated direct current generating system.

It is another object of this invention to provide an automatically regulated DC signal generating system that is dependable yet reliable in providing a high voltage, high current signal.

It is still another object of this invention to provide an automatically regulated DC signal generating system that is suitable for use with a pulse input signal.

It is yet another object of this invention to provide an automatically regulated DC signal generating system that regulates the magnitude of an AC signal prior to coupling of the AC signal to a transformer primary circuit.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate one complete embodiment of the invention according to the best mode so far devised for the practical application of the principles thereof, and in which.

DESCRIPTION OF THE PREFERRED EMBODIMENT

Figure 1:
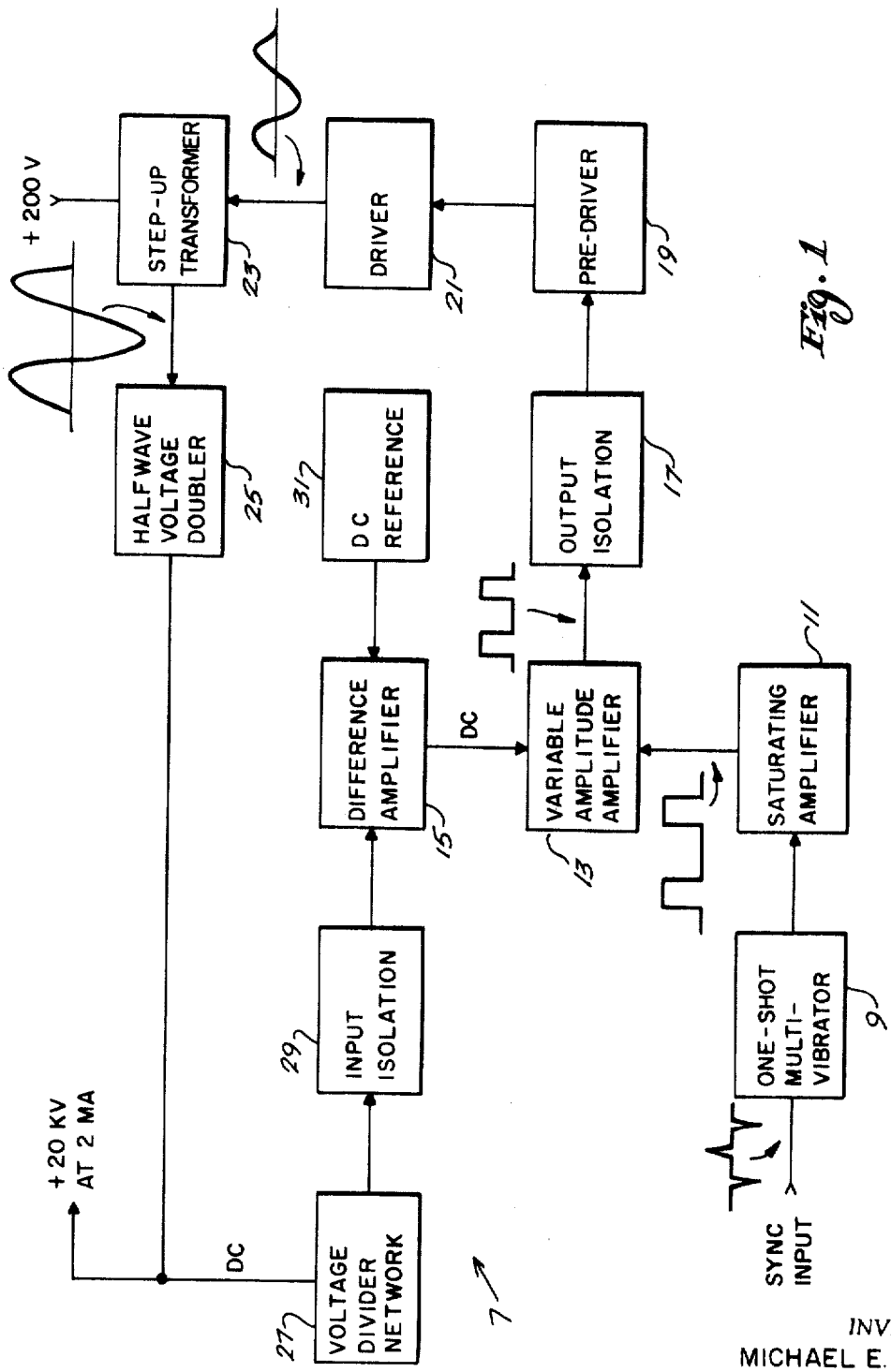
FIG. 1 is a block diagram of the DC current generating system of this invention.

Referring now to the drawings, a pulse input signal (sync input) is coupled to one-shot multivibrator 9 of the regulated direct current generating system of this invention. In FIG. 1, a typical sync input signal is indicated, which sync input signal can be, for example, the horizontal sync input of a TV system when the regulated DC output signal is to be synchronized with the horizontal sweep of the TV system and the thus produced regulated DC output signal coupled to the cathode-ray tube of the system.

The output from one-shot multivibrator 9 is a square wave signal and can have a variable duty cycle as brought out more fully hereinafter. The output from one-shot multivibrator 9 is then coupled through saturating amplifier 11, the output of which is a square wave signal of substantially equal amplitude square waves (the square wave form being shown by way of example, in FIG. 1) to variable amplitude amplifier 13, where the amplitude of the square wave output signal is controlled by a DC signal input from difference amplifier 15.

The amplitude controlled square wave output signal from variable amplitude amplifier 13 is coupled through output isolation stage 17 to predriver 19. The output from predriver 19 is then coupled through driver 21 to step-up transformer 23, the primary of which is tuned so that a sine wave signal appears at the transformer primary (as depicted, again by way of example, by the sine wave form in FIG. 1).

The sine wave output from step-up transformer 23 (as again depicted, by way of example, in FIG. 1) is then coupled to half wave voltage doubler 25 where the AC signal is rectified to produce a DC output signal. When utilized in a TV system to be supplied to a cathode-ray tube, this output is preferably a +20 kv. signal at 2 millamperes (40 watt output) and is therefore a high voltage, high direct current output signal.

As also shown in FIG. 1, the DC output signal from half-wave voltage doubler 25 is sampled by voltage divider network 27, the output of which is coupled through input isolation stage 29 to difference amplifier 15. Difference amplifier 15 also receives a DC reference voltage from DC reference voltage 31. Any difference between the DC output signal sampled by the voltage divider network and the DC reference voltage coupled to difference amplifier 15 causes amplifier 15 to produce an output error DC signal that is coupled to variable amplitude amplifier 13 to vary the amplitude of the square wave signal supplied through the isolation and driver stages to step-up transformer 23.

A closed-loop degenerative system is thus utilized in this invention for automatic regulation of the generated DC signal. As the DC output voltage increases, the DC error voltage output of the difference amplifier 15 changes in a direction so as to decrease the amplitude of the square wave pulses at the output of variable amplitude amplifier 13. The opposite occurs, of course, when the DC output signal decreases.

Figure 2:
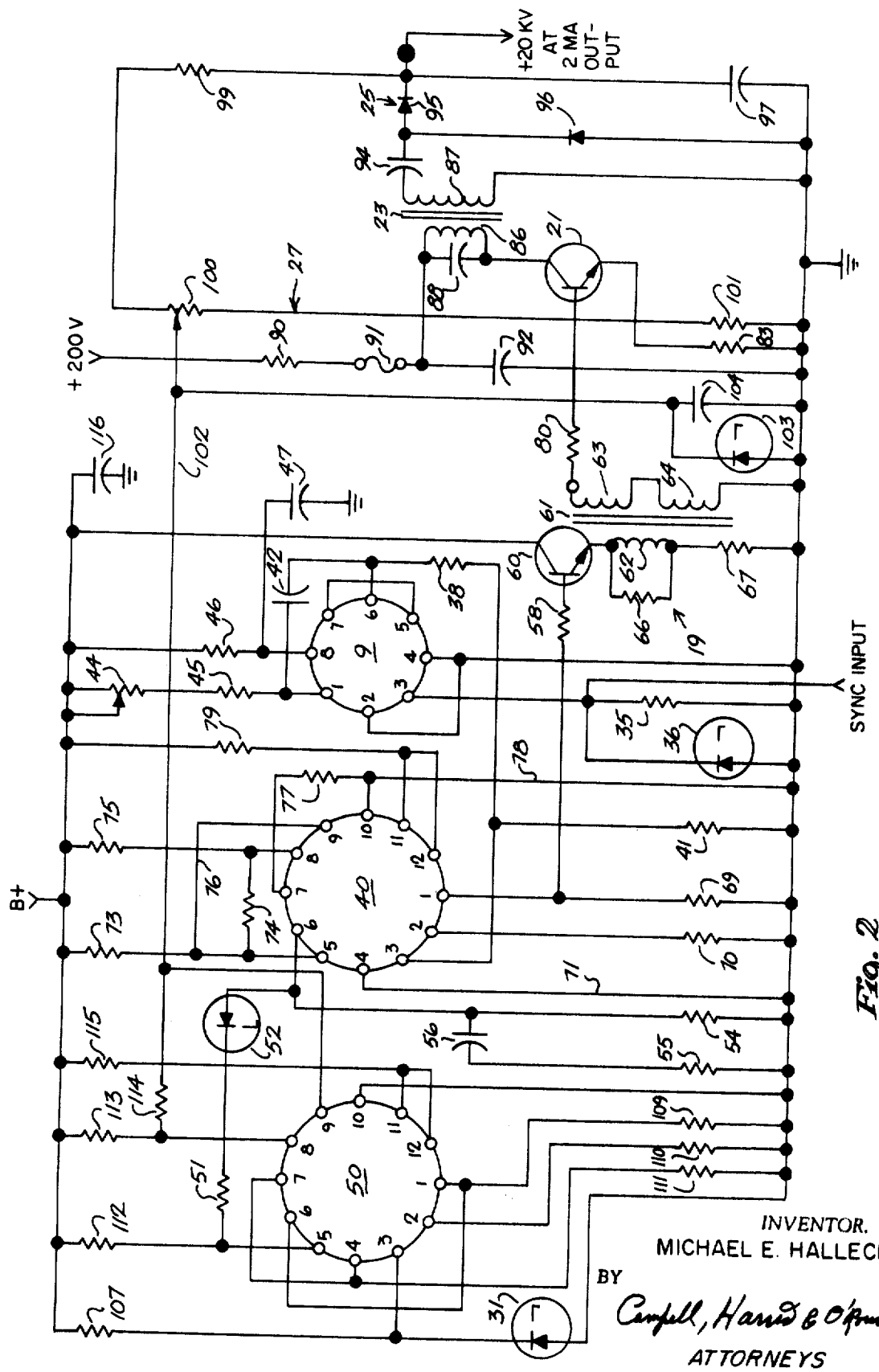
FIG. 2 is a schematic circuit diagram of the DC current generating system of this invention as shown in block form in FIG. 1.

Referring now to FIG. 2, the sync input signal is shown coupled to pin 3 of micrologic, or integrated, circuit 9, which is connected to serve as a one-shot multivibrator. Pin 3 of micrologic circuit 9 is also connected with ground through a resistor 35 and parallel connected Zener diode 36.

The output from micrologic circuit 9 (i.e., from the one-shot multivibrator) is DC coupled from pin 6 through resistor 38 to pin 3 of micrologic, or integrated, circuit 40. Pin 3 of micrologic circuit 40 is also connected with ground through resistor 41.

As shown in FIG. 2, pin 1 of micrologic circuit 9 is connected to pin 6 through capacitor 42, and to the B+ voltage source (which is +12 volts) through potentiometer 44 and resistor 45 connected in series with one another. Potentiometer 44 is used to change the duty cycle of the one-shot multivibrator and serves as a current limiting control. Pin 8 of micrologic circuit 9 is connected to the B+ voltage source through resistor 46 and to ground through capacitor 47.

Micrologic circuit 40 includes saturating amplifier 11, variable amplitude amplifier 13, and output isolation stage 17. DC coupling is provided in the circuit between isolation stage 17 and variable amplitude amplifier 13 and forms a low impedance to predriver 19.

As also shown in FIG. 2, micrologic, or integrated, circuit 50 is provided, and this micrologic circuit includes difference amplifier 15 and input isolation stage 29. The input from difference amplifier 15 to the variable amplitude amplifier 13 is DC coupled from pin 5 of micrologic circuit 50 through resistor 51 and Zener diode 52, in series with one another, to pin 6 of micrologic circuit 40. Pin 6 of micrologic circuit 40 is also connected with ground through resistor 54 and series connected resistor 55 and capacitor 56.

The output from micrologic circuit 50, which is the output from output isolation stage 17, is positive-going signal the amplitude of which is controlled by the DC error voltage from difference amplifier 15 and the duty cycle of which may be varied by potentiometer 44. This output signal is coupled from pin 1 of micrologic circuit 40 through resistor 58 to the base of transistor 60 of predriver 19 which also includes transformer 61.

Transistor 60 drives the output stage and provides protection to micrologic circuit 40 in the event of failure of transistors 60 or 21 (driver). The collector of transistor 60 is connected to the B+ voltage source, while the emitter is connected to primary 62 of transformer 61, which transformer has two secondaries, 63 and 64. Primary 62 has resistor 66 connected in parallel therewith and resistor 67 connected in series therewith to ground.

Pin 1 of micrologic circuit 40 is connected with ground through resistor 69, while pin 2 is connected with ground through resistor 70. Pin 4 of micrologic circuit 40 is connected to ground by lead 71, while pin 5 is connected to the B+ power supply through resistor 73 and to pin 8 through resistor 74. Pin 8 of micrologic circuit 40 is also connected to the B+ power source through resistor 75. Pin 5 of micrologic circuit 40 is also connected to pin 9 through lead 76, while pin 7 is connected to ground through resistor 77. Pin 10 of micrologic circuit 40 is connected to ground by means of lead 78, while pins 11 and 12 are connected to the B+ power supply through resistor 79.

Secondary winding 64 of transformer 61 of predriver 19 is connected at one side to ground and at the other side to secondary 63, the other side of secondary 63 being connected to driver 21 through resistor 80. When the sync signal is applied, the positive and negative going signal turns driver 21 "OFF" and "ON" at a rate determined by the frequency of the sync signal. If the sync signal is a horizontal sync signal, then the driver is turned "OFF" and "ON" at the horizontal sweep rate.

The emitter of driver 21 is connected with ground through resistor 83, while the collector is connected to step-up transformer 23 and, more particularly, to primary 86 of transformer 23, which is tuned by capacitor 88 in parallel therewith when horizontal sync input is to be applied, primary 86 is tuned to the horizontal sweep rate. As the input signal to the base of transistor 21 goes between positive and negative at a horizontal rate (when horizontal sync is applied), the tuned circuit at the collector of driver 21 will provide a sine wave signal at the horizontal rate with the amplitude of the signal being determined by the amplitude and duty cycle of the signal appearing at the base from output isolation stage 17. The secondary 87 of transformer 23 has the necessary turns-ratio to supply the desired sine wave output (+20 kv. when used in a TV system, as indicated in FIG. 1). Current limiting resistor 90 and fuse 91 are connected to the collector of transistor 21 through primary 86 of transformer 23 and capacitor 88, while the junction of fuse 91 and primary 86 — capacitor 88 is connected with ground through capacitor 92.

The output from secondary 87 of transformer 21 is coupled to half-wave voltage doubler 25, which, as shown in FIG. 2, consists of diodes 95 and 96, and capacitors 94 and 97. The rectified DC output signal may then be coupled out from the system for utilization.

The output from half-wave voltage doubler 25 is sampled by voltage divider 27 and a small portion of the signal coupled to input isolation stage 29 in micrologic circuit 50. Voltage divider 27 consists of resistors 99, potentiometer 100, and resistor 101. The center tap of potentiometer 100 is connected by means of lead 102 to pin 9 of micrologic circuit 50 and hence to input isolation stage 29 in micrologic circuit 50. When the output DC voltage is +20 kilovolts, +7.4 volts DC at the wiper arm of potentiometer 100 of voltage divider 27 is preferably fed to input isolation stage 29. Since output voltage is controlled by the output of difference amplifier, potentiometer 100 is used to vary the DC output voltage with the normal range being between 18.5 kilovolts and 21.5 kilovolts.

Input isolation stage 29, which receives the sampled DC output voltage on lead 102, is preferably a Darlington input isolation stage which provides high input impedance to minimize loading of the sampled output voltage and a low output impedance to drive the difference amplifier.

Lead 102 is also connected to one side of parallel connected Zener diode 103 and capacitor 104, the other side of these elements being connected to ground, so that Zener diode 103 and capacitor 104 form an arc protector device for micrologic circuit 50.

DC reference 31 is a Zener diode connected between ground and pin 3 of micrologic circuit 50. The DC output voltage at the output of Darlington isolation stage 29 in micrologic circuit 50 is compared with the Zener diode reference voltage at difference amplifier 15, with any resulting DC error voltage from the output of difference amplifier 15 (which is also in micrologic circuit 50) representing the error between the sampled input voltage and the reference voltage. The DC error voltage from difference amplifier 15 is coupled from pin 5 of micrologic circuit 50 to pin 6 of micrologic circuit 40 (and hence to variable amplitude amplifier 13 in micrologic circuit 40) to control the amplitude of the square wave signal coupled to transformer 23.

Pin 3 of micrologic circuit 50 is connected to the B+ voltage source through resistor 107, while pin 1 is connected to ground through resistor 109. Pin 2 of micrologic circuit 50 is connected to ground through resistor 110, while pins 4 and 7 are connected to ground through resistor 111. Pin 5 of micrologic circuit 50 is connected to the B+ power source through resistor 112, while pin 8 is connected to the B+ power source through resistor 113 and to lead 102 through resistor 114. Pins 11 and 12 of micrologic circuit 50 are connected to the B+ power supply through resistor 115, while capacitor 116 is connected between the B+ power supply and ground.

The following is a listing of typical component values that can be utilized in this invention, it not being intended, however, that the invention be limited to the particular values set forth: Micrologic circuits – 9 – UL914, 40 and 50 – CA3018; Transistors – 21 – DTS–410, 60 – 2N3642; Zener diodes – 31 and 36 – 1N753A, 52 – 1N755A, 103 – 1N758A; Capacitors ($\mu$F) – 42 – 0.0068, 47 – 0.01, 56 – 0.1, 88 – 0.12, 92 – 2, 94 and 97 – 500 PF, 104 – 0.0047, 116 – 15; Fuse – 0.5A; Resistors (ohms) – 35, 38, 46, 66, 69, 107, 111, 112, 113 and 115 – 1K, 41, 70, 73 and 110 – 10K, 44 – 0–5K, 45 – 12K, 51 – 330, 54 and 74 – 3K, 55 – 470, 58, 67 and 79 – 100, 75 – 1.3K, 77 – 240, 80 and 90 – 10, 83 – 47, 99 – 200 Meg., 100 – 0—25K, 101 – 68K, 109 – 5.1K, 114 – 510K.

In operation, when horizontal sync input pulses are applied to one-shot multivibrator 9, a square wave signal is formed and coupled through saturating amplifier 11 to variable amplitude amplifier 13 where the amplitude of the square wave signal is controlled by the DC output from difference amplifier 15. This amplitude controlled square wave is then coupled through output isolation 17 and the drivers 19 and 21 to step-up transformer 23 where it appears at the primary (tuned to horizontal rate) as a sine wave. This sine wave is coupled from the secondary of the transformer as a +20 kilovolt peak-to-peak signal and rectified at the half-wave doubler 25 with the DC output being a +20 KV at 2 MA signal which can then be coupled from the system for use, such as with a cathode-ray tube. The sampled output voltage is coupled back through input isolation 29 to difference amplifier 15 where the sampled DC voltage is compared with a DC reference voltage from DC reference 31 and an error signal produced by the difference amplifier if the DC output signal has deviated from the desired magnitude. Any such error signal will be coupled to variable amplitude amplifier 13 to vary the magnitude of the square wave signal supplied through the isolation stage and drivers to the transformer to thus restore the desired DC output signal.

I claim:

1. An automatically regulated direct current generating system, comprising: input means adapted to receive an AC signal; amplitude control means for receiving said AC signal from said input means and producing an amplitude controlled AC output signal; isolation means; DC generating means including a transformer connected with said amplitude control means through said isolation means to receive said amplitude controlled AC output signal therefrom and responsive thereto producing a DC output voltage; and control means for sampling said DC output voltage from said DC generating means and producing an error voltage when the amplitude of said DC output voltage varies from a predetermined level, said error voltage being coupled to said amplitude control means to control the amplitude of said AC output signal coupled therefrom.

2. An automatically regulated direct current generating system, comprising input means including a one-shot multivibrator for receiving a pulse input and producing a square wave signal output in response thereto; amplitude control means for receiving said square wave signal output from said multivibrator and controlling the amplitude of said signal output so as to produce an amplitude controlled square wave output signal, said square wave signal from said one-shot multivibrator being coupled through a saturating amplifier prior to being coupled to said amplitude control means; DC generating means connected with said amplitude control means to receive said amplitude control square wave output signal therefrom and responsive thereto producing a DC output voltage; and control means for sampling said DC output voltage from said DC generator means and producing an error voltage when the amplitude of said DC output voltage varies from a predetermined level, said error voltage being coupled to said amplitude control means to control the amplitude of said square wave signal output coupled therefrom.

3. An automatically regulated direct current generating system, comprising: input means adapted to receive a pulse signal; square wave generating means including a one-shot multivibrator and saturating amplifier; amplitude control means for receiving the output from said square wave generating means and providing an amplitude controlled square wave output signal; a transformer having a primary and a secondary, said primary being connected to receive an AC signal indicative of said square wave output signal from said amplitude control means; rectifier means connected with the secondary of said transformer for producing a DC output voltage the magnitude of which is dependent upon the amplitude of said AC signal received at the primary of said transformer; and control means for sampling said DC output voltage and providing an error voltage when said output voltage varies from a predetermined magnitude, said error voltage being coupled to said amplitude control means to control the amplitude of the output signal therefrom.

4. The automatically regulated direct current generating system of claim 3 wherein said one-shot multivibrator has a potentiometer connected therewith for controlling the multivibrator duty cycle.

5. An automatically regulated direct current generating system, comprising: input means adapted to receive a pulse signal; square wave generating means for receiving said pulse signal and responsive thereto generating a square wave output signal; amplitude control means for receiving the output from said square wave generating means and for providing an amplitude controlled square wave output signal; isolation means; a transformer having a primary and a secondary, said primary being connected to said amplitude control means through said isolation means to receive an AC signal indicative of said square wave output signal from said amplitude control means, said amplitude controlled square wave signal being coupled to said transformer through isolation means; rectifier means connected with the secondary of said transformer for producing a DC output signal the magnitude of which is dependent upon the amplitude of said AC signal received at the primary of said transformer; and control means for sampling said DC output signal and providing an error signal when said output signal varies from a predetermined magnitude, said error signal being coupled to said amplitude control means to control the amplitude of the output signal therefrom.

6. The automatically regulated direct current generating system of claim 5 wherein said amplitude controlled square wave signal is coupled to said transformer through said isolation means and through a driver and a predriver that includes an amplifier and a second transformer.

7. An automatically regulated direct current generating system, comprising: input means adapted to receive a pulse signal; a one-shot multivibrator for receiving said pulse signal from said input means and responsive thereto generating a square wave output signal; a saturating amplifier for receiving said square wave output signal from said one-shot multivibrator and producing a square wave output signal of substantially equal amplitude; amplitude control means for receiving said square wave signal from said saturating amplifier and producing an amplitude controlled output signal; output isolation means; a predriver including a first transistor and a first transformer with said first transistor receiving said amplitude controlled square wave output signal from said amplitude control means through said isolation means; a driver connected with said first transformer; a second transformer connected with said driver and having a tuned primary so that a sine wave signal appears at said primary; a half-wave voltage doubler connected with the secondary of said transformer and producing a DC output voltage indication of the sine wave signal appearing at the secondary of said second transformer; a voltage divider for sampling said DC output voltage; input isolation means; a DC reference voltage; and a difference amplifier for receiving said sampled DC output voltage through said input isolation means and said DC reference voltage and producing an error voltage when said DC output voltage is other than at a predetermined level that is coupled to said amplitude control means to thereby automatically vary the amplitude of said square wave signal produced by said amplitude control means in a direction to cause said DC output voltage to be returned to said predetermined level.

8. An automatically regulated direct current system, comprising: input means adapted to receive an AC input signal; amplitude control means for receiving said AC input signal from said input means and for regulating the amplitude of said input signal so as to produce an amplitude controlled AC output signal; DC generating means connected with said amplitude control means to receive said amplitude controlled AC output signal therefrom and responsive thereto for producing a high voltage and high current DC output signal; and control means for sampling said DC output signal from said DC generator means and producing an error signal when the amplitude of said DC output signal varies from a predetermined level, said error signal being coupled to said amplitude control means to increase the amplitude of said AC input signal in the event said DC output signal falls below said predetermined level and to decrease the amplitude of said AC input signal in the event said DC output signal rises above said predetermined level.